United States Patent
Michaud (10) Patent No.: US 10,437,495 B1
(45) Date of Patent: Oct. 8, 2019

(54) STORAGE SYSTEM WITH BINDING OF HOST NON-VOLATILE MEMORY TO ONE OR MORE STORAGE DEVICES

(71) Applicant: EMC IP Holding Company LLC, Hopkinton, MA (US)

(72) Inventor: Adrian Michaud, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/956,309

(22) Filed: Apr. 18, 2018

(51) Int. Cl.
*G06F 3/06* (2006.01)
*G06F 9/4401* (2018.01)
(Continued)

(52) U.S. Cl.
CPC ............ *G06F 3/0631* (2013.01); *G06F 3/067* (2013.01); *G06F 3/0611* (2013.01); *G06F 3/0644* (2013.01); *G06F 3/0679* (2013.01); *G06F 9/4401* (2013.01); *G06F 9/44505* (2013.01); *G06F 12/0804* (2013.01); *G06F 13/4221* (2013.01); *G06F 2212/1016* (2013.01); *G06F 2212/202* (2013.01); *G06F 2213/0026* (2013.01)

(58) Field of Classification Search
CPC .... G06F 3/0631; G06F 3/0644; G06F 3/0611; G06F 3/067; G06F 3/0679; G06F 12/0804; G06F 13/4221; G06F 9/44505; G06F 9/4401; G06F 2213/0026; G06F 2212/202; G06F 2212/1016
See application file for complete search history.

(56) References Cited

U.S. PATENT DOCUMENTS

| | | | | |
|---|---|---|---|---|
| 5,442,747 A | * | 8/1995 | Chan | G06F 12/0848 345/534 |
| 2006/0195801 A1 | * | 8/2006 | Iwamura | G06F 3/0362 715/864 |

(Continued)

OTHER PUBLICATIONS

Kevin Marks, "An NVM Express Tutorial," Flash Memory Summit, 2013, 92 pages.

(Continued)

*Primary Examiner* — Hiep T Nguyen
(74) *Attorney, Agent, or Firm* — Ryan, Mason & Lewis, LLP (57) ABSTRACT

A storage system in one embodiment comprises a host processor that includes a first non-volatile memory. The storage system further comprises a storage device that is coupled to the host processor. A designated portion of the first non-volatile memory is bound to the storage device responsive to storage of binding information in at least one partition table associated with the first non-volatile memory. The storage device may include a storage controller that includes a configuration register space. The binding information may be copied from the one or more partition tables to the configuration register space in conjunction with a boot operation of the host processor. The host processor illustratively comprises a storage device driver having access to the binding information copied to the configuration register space of the storage device. The storage device driver may be configured to utilize the designated portion of the first non-volatile memory that is bound to the storage device as a write back cache.

20 Claims, 8 Drawing Sheets (51) Int. Cl.
  *G06F 9/445*   (2018.01)
  *G06F 13/42*   (2006.01)
  *G06F 12/0804* (2016.01)

(56)         References Cited

U.S. PATENT DOCUMENTS

2014/0365707 A1    12/2014  Talagala et al.
2015/0032975 A1     1/2015  Ruberg et al.
2017/0185645 A1*    6/2017  Agarwal ............. G06F 12/0238
2017/0269956 A1*    9/2017  Shacham ............ G06F 9/45558
2017/0351452 A1    12/2017  Boyd et al.
2018/0018171 A1     1/2018  Amidi et al.
2018/0095884 A1*    4/2018  Kaminski ............. G06F 3/0611
2019/0004940 A1*    1/2019  Boyd .................. G06F 12/0246
2019/0149341 A1*    5/2019  Robison ................ H04L 9/3268

OTHER PUBLICATIONS

NVM Express, "NVMe Specification," Revision 1.3, May 1, 2017, 282 pages.

* cited by examiner

|   | 8GB | | WHIPSAW | | 8GB | | |
|---|---|---|---|---|---|---|---|
| 1 | 8GB | 16,691KB/s / 4,172 iops<br>202.65 usec clat | | 79,479KB/s / 19,869 iops<br>61 usec clat | | +62,788KB/s / +15,697 iops<br>-202.04 usec clat | 376%<br>Faster | 331 x lower |
| 2 | 8GB | 18,216KB/s / 4,553 iops<br>185.13 usec clat | | 79,983KB/s / 19,995 iops<br>69 usec clat | | +61,767KB/s / +15,442 iops<br>-184.44 usec clat | 339%<br>Faster | 267 x lower |
| 3 | 8GB | 16,553KB/s / 4,138 iops<br>205.11 usec clat | | 81,306KB/s / 20,326 iops<br>61 usec clat | | +64,753KB/s / +16,188 iops<br>-204.5 usec clat | 391%<br>Faster | 335 x lower |
| 4 | 8GB | 20,080KB/s / 5,019 iops<br>164.24 usec clat | | 77,741KB/s / 19,435 iops<br>67 usec clat | | +57,661KB/s / +14,416 iops<br>-163.57 usec clat | 287%<br>Faster | 263 x lower |
| 5 | 8GB | 16,939KB/s / 4,234 iops<br>199.46 usec clat | | 79,228KB/s / 19,806 iops<br>62 usec clat | | +62,289KB/s / +15,572 iops<br>-198.84 usec clat | 367%<br>Faster | 320 x lower |
| 6 | 8GB | 17,214KB/s / 4,303 iops<br>196.95 usec clat | | 75,978KB/s / 18,994 iops<br>68 usec clat | | +58,764KB/s / +14,691 iops<br>-196.27 usec clat | 341%<br>Faster | 288 x lower |
| 7 | 8GB | 17,962KB/s / 4,490 iops<br>187.04 usec clat | | 77,173KB/s / 19,293 iops<br>68 usec clat | | +59,211KB/s / +14,803 iops<br>-186.36 usec clat | 329%<br>Faster | 274 x lower |
| 8 | 8GB | 20,912KB/s / 5,228 iops<br>159.26 usec clat | | 77,926KB/s / 19,481 iops<br>67 usec clat | | +57,014KB/s / +14,253 iops<br>-158.59 usec clat | 272%<br>Faster | 236 x lower |
| TOTAL | 64GB | 144 MB/s / 36K iops<br>Average: 187.46 usec clat | | 628 MB/s / 157K iops<br>Average: 65 usec clat | | +484 MB/s / +121K iops<br>-186.81 usec clat | 334%<br>Faster | 287 x lower |

FIG. 7

```
[global]
size=8g
directory=/mnt/testmount
ioengine=libaio
iodepth=1
direct=1

[bgwriter]
rw=randwrite

[bgwriter]
rw=randwrite

[bgwriter]
rw=randwrite

[bgwriter]
rw=randwrite

[bgwriter]
rw=randwrite

[bgwriter]
rw=randwrite

[bgwriter]
rw=randwrite

[bgwriter]
rw=randwrite
```

FIG. 8

STORAGE SYSTEM WITH BINDING OF HOST NON-VOLATILE MEMORY TO ONE OR MORE STORAGE DEVICES

FIELD

The field relates generally to information processing systems, and more particularly to storage in information processing systems.

BACKGROUND

Storage systems are increasingly utilizing non-volatile memory such as flash memory. For example, a given such system may illustratively comprise at least one storage tier comprising multiple solid-state drives (SSDs) which are implemented using flash memory or other types of non-volatile memory. All-flash storage arrays are also commonly implemented. In these and other storage systems that incorporate storage devices comprising non-volatile memory, peripheral component interconnect express (PCIe) interfaces are commonly used to support communications between a host processor and the storage devices. Although PCIe can support high bandwidth interconnections between the host processor and storage devices, it also exhibits an inherently high latency.

The high latency associated with PCIe becomes even more apparent when many small random input-output (IO) operations are issued, which is becoming increasingly common as storage devices with low-latency media are used to help bridge the performance gap between memory and traditional storage devices.

Although attempts have been made to address this issue through the use of low-latency software-based caches, such arrangements can reduce write operation durability, as volatile memory is traditionally used as the caching medium. Applications that require durable writes often cannot take advantage of low-latency software-based caches because they constantly flush data in a synchronous manner to the storage devices.

A need therefore exists for improved techniques for alleviating adverse performance impacts of the high latency commonly associated with utilization of PCIe interfaces in storage systems.

SUMMARY

Illustrative embodiments of the present invention provide storage systems configured to implement binding of host non-volatile memory to one or more storage devices. Such arrangements advantageously avoid the high latency of PCIe interfaces for any accesses to the bound host non-volatile memory.

In one embodiment, a storage system comprises a host processor that includes a first non-volatile memory. The storage system further comprises a storage device that is coupled to the host processor. A designated portion of the first non-volatile memory is bound to the storage device responsive to storage of binding information in at least one partition table associated with the first non-volatile memory. The one or more partition tables may be part of the first non-volatile memory.

The storage device may comprise a second non-volatile memory that in combination with the designated portion of the first non-volatile memory provides a unified non-volatile memory space for the storage device.

The storage system may include one or more additional storage devices, each also being coupled to the host processor. In such an arrangement, different portions of the first non-volatile memory may be bound to respective different ones of the storage devices by storage of respective different binding information in the one or more partition tables associated with the first non-volatile memory.

The storage device in some embodiments further comprises a storage controller that includes a configuration register space. At least a portion of the binding information is copied from the one or more partition tables to the configuration register space in conjunction with a boot operation of the host processor.

The host processor in some embodiments further comprises a storage device driver having access to the binding information copied to the configuration register space of the storage device. The storage device driver may be configured to utilize the designated portion of the first non-volatile memory that is bound to the storage device as a write back cache, although a wide variety of alternative usage contexts are possible.

The designated portion of the first non-volatile memory that is bound to the storage device may be accessible by the storage device driver over a local memory fabric of the host processor utilizing local memory semantics. The local memory fabric is separate from a PCIe fabric over which the storage device communicates with a root port of a PCIe root complex of the host processor.

In some embodiments, the binding information comprises at least a base address and a limit for the designated portion of the first non-volatile memory that is bound to the storage device. Such binding information may be copied from the one or more partition tables to one or more designated vendor-specific registers of a PCIe configuration register space of the storage device in conjunction with a boot operation of the host processor.

Storage of the binding information in the one or more partition tables to bind the designated portion of the first non-volatile memory to the storage device may be performed at least in part by a basic input/output system (BIOS) of the host processor of the storage system.

Additionally or alternatively, other host processor components such as a baseboard management controller (BMC) of the host processor can at least partially control or otherwise participate in the binding process.

These and other illustrative embodiments include, without limitation, apparatus, systems, methods and computer program products comprising processor-readable storage media.

BRIEF DESCRIPTION OF THE DRAWINGS

FIG. 7 is a table of example test data showing performance improvements achieved in an illustrative embodiment that utilizes a bound portion of a host non-volatile memory as a write back cache.

DETAILED DESCRIPTION

Illustrative embodiments of the present invention will be described herein with reference to exemplary storage systems and associated computers, servers, storage devices and other processing devices. It is to be appreciated, however, that embodiments of the invention are not restricted to use with the particular illustrative system and device configurations shown. Accordingly, the term "storage system" as used herein is intended to be broadly construed, so as to encompass, for example, cloud-based storage systems, as well as other types of storage systems comprising various combinations of physical and virtual processing resources. Storage systems as disclosed herein can therefore be implemented as enterprise storage systems, cloud-based storage systems, or in other configurations. A given such storage system may be part of a larger information processing system that includes compute nodes or other types of processing devices that utilize the storage system.

Figure 1:
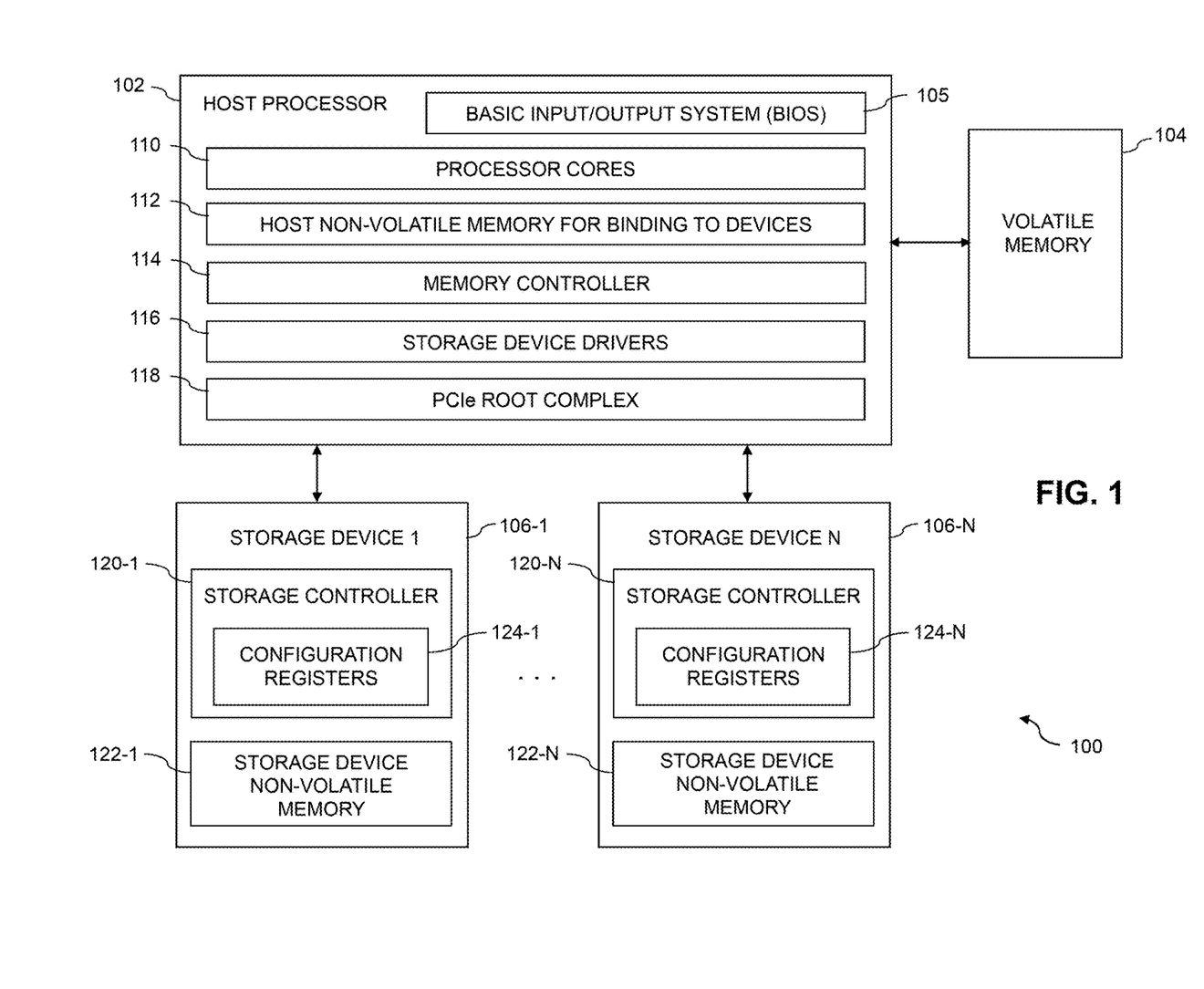
FIG. 1 is a block diagram of a storage system configured to implement binding of host non-volatile memory to one or more storage devices in an illustrative embodiment.

FIG. 1 shows a storage system 100 configured in accordance with an illustrative embodiment. The storage system 100 comprises a host processor 102, a volatile memory 104 coupled to the host processor 102, and a plurality of storage devices 106-1 through 106-N each also coupled to the host processor 102.

The host processor 102 comprises BIOS 105, processor cores 110, host non-volatile memory 112 for binding to one or more of the storage devices 106, a memory controller 114, storage device drivers 116, and a PCIe root complex 118. The storage device drivers 116 communicate with respective ones of the storage devices 106 via respective root ports of the PCIe root complex 118 of the host processor 102.

The host non-volatile memory 112 illustratively comprises one or more partition tables, examples of which will be described in more detail in conjunction with the embodiment of FIG. 4 below.

A designated portion of the host non-volatile memory 112 is bound to a given one of the storage devices 106 responsive to storage of binding information in at least one partition table associated with the host non-volatile memory 112. The one or more partition tables are illustratively part of the host non-volatile memory 112, but in other embodiments may be implemented externally to the host non-volatile memory 112. For example, in some embodiments, the host processor 102 may comprise one or more other non-volatile memories in addition to the host non-volatile memory 112. Other arrangements of electronic memories or other types of storage devices may be used to implement one or more partition tables within or otherwise in association with the host processor 102.

The designated portion of the host non-volatile memory 112 that is bound to a given one of the storage devices 106 can in some implementations be the entire host non-volatile memory 112, or substantially all of the host non-volatile memory 112, although more typically different portions of the host non-volatile memory 112 will be bound to respective different ones of the storage devices 106.

The storage devices 106-1 through 106-N illustratively comprise respective storage controllers 120-1 through 120-N and respective storage device non-volatile memories 122-1 through 122-N. The storage controllers 120-1 through 120-N comprise respective sets of configuration registers 124-1 through 124-N. A given such set of configuration registers is an example of what is referred to herein as a "configuration register space." Such a register space may comprise multiple registers, a single register, or a portion of one or more registers of the corresponding storage device.

The sets of configuration registers 124 can include a variety of different types of registers. For example, the sets of configuration registers 124 can include a plurality of base address registers (BARs) for their respective storage devices 106.

The storage devices 106 and storage controllers 120 may further comprise additional components of a type commonly found in conventional implementations of such storage devices and storage controllers, although these additional components are omitted from the figure for simplicity and clarity of illustration.

A given one of the storage devices 106 having a portion of the host non-volatile memory 112 bound thereto in the manner disclosed herein also includes its corresponding instance of the storage device non-volatile memories 122. That instance in combination with the designated portion of the host non-volatile memory 112 bound to the given storage device illustratively provides a unified non-volatile memory space for the storage device, although in other embodiments the two different non-volatile memory spaces of the given storage device may be considered entirely separate non-volatile memory spaces rather than a single unified non-volatile memory space.

Different portions of the host non-volatile memory 112 may be bound to respective different ones of the storage devices 106 by storage of respective different binding information in the one or more partition tables associated with the host non-volatile memory 112.

The binding information that binds a designated portion of the host non-volatile memory 112 to a given one of the storage devices 106 is copied from the one or more partition tables of the host processor 102 to the configuration register space of that storage device in conjunction with a boot operation of the host processor 102. This operation is illustratively performed by the BIOS 105 of the host processor 102. In some embodiments, only part of the binding information stored in the one or more partition tables is replicated or otherwise copied to the configuration register space of the corresponding storage device.

The binding of portions of the host non-volatile memory 112 to respective ones of the storage devices 106 in the present embodiment is assumed to be a permanent binding, in that the binding persists for as long as the corresponding storage device is part of the storage system 100. For example, the binding will persist until such time as the storage device is replaced or is otherwise removed from the storage system 100. It is therefore not a temporary association that persists for only a short period of time during the operation of the storage device. However, terms such as "permanent" and "temporary" as used herein are relative terms, and are intended to be broadly construed. Such terms should not be viewed as having any particular respective time periods associated therewith.

Different ones of the storage device drivers 116 are utilized by the host processor 102 to communicate with respective ones of the storage devices 106. A given one of the storage device drivers 116 has access to the binding information copied to the configuration register space of the corresponding one of the storage devices 106.

The given storage device driver may be configured to utilize the designated portion of the host non-volatile memory 112 that is bound to the corresponding storage device as a write back cache, or for any of a wide variety of other purposes.

The designated portion of the host non-volatile memory 112 that is bound to the corresponding storage device is accessible by the given storage device driver over a local memory fabric of the host processor 102 utilizing local memory semantics. The local memory fabric is separate from a PCIe fabric over which the storage device communicates with a root port of the PCIe root complex 118 of the host processor 102.

As indicated above, illustrative embodiments partition the host non-volatile memory 112 into multiple portions that are bound to different ones of the storage devices 106. Such binding provides an improved storage system architecture that extends the non-volatile memory resources that belong to a given storage device but with the extended portion residing much closer to the host processor 102. These and other illustrative embodiments can provide dramatic performance improvements in the storage system 100 relative to conventional arrangements by avoiding the high latency of PCIe interfaces for any accesses to the bound portion of the host non-volatile memory 112.

In some embodiments, the above-noted binding information comprises at least a base address and a limit for the designated portion of the host non-volatile memory 112 that is bound to the corresponding one of the storage devices 106. The binding information may be copied from the one or more partition tables to one or more designated vendor-specific registers of a PCIe configuration register space of the corresponding storage device in conjunction with a boot operation of the host processor 102.

The BIOS 105 in the present embodiment is configured to store the binding information in the one or more partition tables in order to bind the designated portion of the host non-volatile memory 112 to the corresponding one of the storage devices 106. Such an operation can be performed automatically by the BIOS 105. For example, the BIOS 105 can be configured to store appropriate binding information in the one or more partition tables so as to automatically divide the host non-volatile memory 112 into N different portions that are bound to respective ones of the storage devices 106. These different bound portions of the host non-volatile memory 112 may be of equal sizes, although it is also possible for different-size portions to be bound to the respective storage devices 106.

In other embodiments, a user of the storage system 100 can manually configure the binding of portions of the host non-volatile memory 112 to respective ones of the storage devices 106, possibly using a setup menu of the BIOS 105.

Additionally or alternatively, other components of the host processor 102 can participate in an automatic or manual binding process of the type described above. For example, storage of the binding information in the one or more partition tables associated with the host non-volatile memory 112 may be performed at least in part under the control of a baseboard management controller (BMC) of the host processor 102.

It should be noted that storage system 100 may comprise additional or alternative components. For example, one or more PCIe switches may be arranged between the host processor 102 and the storage devices 106.

The host processor 102 may comprise a central processing unit (CPU) or other type of processor implemented in a server, computer or other processing device. The host processor 102 may be part of physical infrastructure that is utilized to implement virtual machines, containers or other virtual processing devices.

The storage devices 106 may be part of a storage area network (SAN) or other type of network of the storage system 100. In some embodiments, data transfer in the storage system 100 can utilize techniques such as remote direct memory access (RDMA) connections over InfiniBand or Gigabit Ethernet. Numerous other types of connections and associated data transfer protocols can be used in other embodiments.

The storage devices 106 in some embodiments comprise solid-state storage devices such as flash-based SSDs. A wide variety of other types of storage devices can be used, such as serial attached SCSI (SAS) hard disk drives (HDDs), as well as combinations of different storage devices of different types.

The storage devices 106 are assumed to comprise directly-addressable storage devices that the host processor 102 can access using PCIe reads and writes. Other types of storage devices can be used in other embodiments.

In some embodiments, the storage devices 106 comprise NVM Express (NVMe) storage devices, configured to operate in accordance with the NVMe Specification, Revision 1.3, May 2017, which is incorporated by reference herein.

Although the volatile memory 104 is shown as separate from the host processor 102 in the FIG. 1 embodiment, in other embodiments the volatile memory 104 may be at least partially incorporated into the host processor 102. Accordingly, a volatile memory associated with a host processor in a given embodiment may comprise an internal volatile memory of the host processor. Numerous other arrangements are possible for volatile memory associated with a given host processor.

The volatile memory 104 of the host processor 102 illustratively comprises dynamic random access memory (DRAM) and that the non-volatile memories 122 of the storage devices 106 illustratively comprise NAND-based flash memory. The use of DRAM in the volatile memory 104 provides the host processor 102 with a very low access times to read and write stored data, typically less than about 20 nanoseconds for both read and write operations. Non-volatile memory such as NAND-based flash memory typically has significantly higher access times, and in some cases may have minimum block size restrictions.

The host non-volatile memory 112 in some embodiments is implemented utilizing non-volatile memory that exhibits performance capabilities similar to those of DRAM or other types of volatile RAM. Examples of these and other non-volatile alternatives to flash memory that may be utilized to provide at least a portion of the host non-volatile memory 112 include resistive RAM, phase change RAM, spin torque transfer magneto-resistive RAM (STT-MRAM) and Intel Optane™ devices based on 3D XPoint™ memory, although other types of memories can be used in other embodiments. Such non-volatile memories are examples of what is also referred to herein as "high performance" non-volatile memory.

Although communications between the host processor 102 and the storage devices 106 are illustratively shown as utilizing PCIe connections in the present embodiment, other embodiments can use other types of connections. For example, alternative embodiments can use alternative types of interfaces such as Serial Attached SCSI (SAS) and Serial ATA (SATA). Numerous other interfaces and associated communication protocols can be used in other embodiments. It is therefore to be appreciated that PCIe root complex 118 of the host processor 102 can be entirely eliminated in other embodiments, and the storage devices 106 can be directly connected to the host processor 102.

It is to be appreciated that these and other features of illustrative embodiments are presented by way of example only, and should not be construed as limiting in any way.

Accordingly, different numbers, types and arrangements of host processors and storage devices can be used in other embodiments.

Additional details regarding example process operations associated with binding of host non-volatile memory to one or more storage devices in illustrative embodiments will be provided below in conjunction with the flow diagram of FIG. 2 and the additional illustrative embodiments of FIGS. 3 through 6.

The storage system of the FIG. 1 embodiment may be configured to provide at least a portion of at least one storage tier of a multi-tier storage system. For example, the storage system may comprise at least part of a fast tier of a multi-tier storage system. The fast tier is also commonly referred to as a "performance tier." The fast tier or performance tier is an example of what is more generally referred to herein as a "front-end storage tier" of the multi-tier storage system. As another example, the storage system may comprise at least part of a capacity tier of a multi-tier storage system. The capacity tier is an example of what is more generally referred to herein as a "back-end storage tier" of the multi-tier storage system.

By way of example, a given multi-tier storage system may comprise a fast tier or performance tier implemented using server-based flash storage devices, and a capacity tier implemented using an object store. In such an arrangement, an I/O dispatcher software layer of the storage system may be configured, for example, to pre-fetch data from the object store of the capacity tier into the server-based flash storage devices of the fast tier or performance tier, as well as to support other types of data movement.

A wide variety of other types of server-based flash storage devices and multi-tier storage systems can be used in other embodiments, as will be apparent to those skilled in the art.

It is also possible that the storage system of the FIG. 1 embodiment may be part of a single-tier storage system. For example, it may be combined with additional similar systems or components in forming such a single-tier storage system.

A given storage tier of one of the types described above may comprise one or more object stores, including cloud-based object stores such as Amazon Simple Storage Service (S3), Google Cloud Platform Cloud Storage, and Microsoft Azure Blob Storage. Accordingly, cloud-based implementations of the FIG. 1 storage system are possible.

The particular storage drives used in a given storage tier may be varied depending on the particular needs of a given embodiment, and multiple distinct storage drive types may be used within a single storage tier. The term "storage drive" as used herein is intended to be broadly construed, so as to encompass, for example, disk drives, flash drives, solid-state drives, hybrid drives or other types of storage products and devices.

As another example, the storage system may be used to implement at least a portion of at least one storage node in a cluster file system. Such a cluster file system may comprise a parallel file system, a distributed file system or combinations of multiple file systems of potentially different types.

The storage system of FIG. 1 may be part of a larger storage platform. For example, such a storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX®, Symmetrix VMAX® and Unity™ storage arrays, commercially available from Dell EMC. Other types of storage products that can be used in implementing a given storage platform in an illustrative embodiment include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, the host processor 102 and possibly other components of the storage system 100 may be implemented at least in part using processing devices of such processing platforms.

As indicated above, communications between elements of storage system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the storage system 100 as illustrated in FIG. 1 are presented by way of example only. In other embodiments, only subsets of these components, or additional or alternative sets of components, may be used, and such components may exhibit alternative functionality and configurations.

For example, a computer, server or other host device having multiple CPU sockets each with a separate instance of volatile cache memory is considered a type of "host processor" as that term is broadly used herein. A host processor may also be referred to herein as simply a "host." The term "host" may also refer to a higher-level device such as computer or server that incorporates one or more host processors.

The operation of the storage system 100 will now be described in further detail with reference to the flow diagram of FIG. 2. The process as shown includes steps 200 through 206, and is suitable for use in the storage system 100 but is more generally applicable to other types of storage systems each comprising at least one host processor and one or more storage devices. The particular process as illustrated in FIG.

2 represents just one possible example of a process for binding a designated portion of a host non-volatile memory to a storage device, although it is to be appreciated that this process and numerous other non-volatile memory binding processes may be implemented in other storage systems in other embodiments. The description below refers to a host processor, BIOS, storage devices and storage device drivers, which illustratively correspond to host processor 102, BIOS 105, storage devices 106 and storage device drivers 116 of the storage system 100.

In step 200, host processor BIOS binds a portion of a host non-volatile memory to a particular one of the storage devices by storing corresponding binding information in a partition table of the host non-volatile memory. As indicated previously, the binding in illustrative embodiments disclosed herein is a type of permanent binding that persists for as long as the storage device is part of the storage system. Other types of binding may be used in other embodiments. Terms such as "bind" or "bound" as used herein are intended to be broadly construed, and should not be viewed as being limited to a permanent binding. The host non-volatile memory illustratively comprises a high performance non-volatile memory, providing read and write performance similar to that of host volatile memory.

In step 202, at boot time of the host processor, at least a portion of the binding information previously stored in the partition table is copied from the partition table to a configuration register space of a storage controller of the storage device. The "copying" of the binding information as that term is used herein is intended to be broadly construed to cover a wide variety of different arrangements in which at least portions of the binding information are replicated from the partition table to the configuration register space.

In step 204, a device driver implemented on the host processor accesses the configuration register space of the storage device to obtain a base address and a limit for the bound portion of the host non-volatile memory.

In step 206, the device driver utilizes the base address and the limit for the bound portion of the host non-volatile memory to process 10 operations directed from the host processor to that bound portion of the storage device.

In some embodiments, the bound portion of the host non-volatile memory in combination with another non-volatile memory of the storage device may collectively provide a unified non-volatile memory space for the storage device, where "unified" in this context refers to an arrangement in which the non-volatile memory space is directly accessible to the device driver of the storage device.

Figure 2:
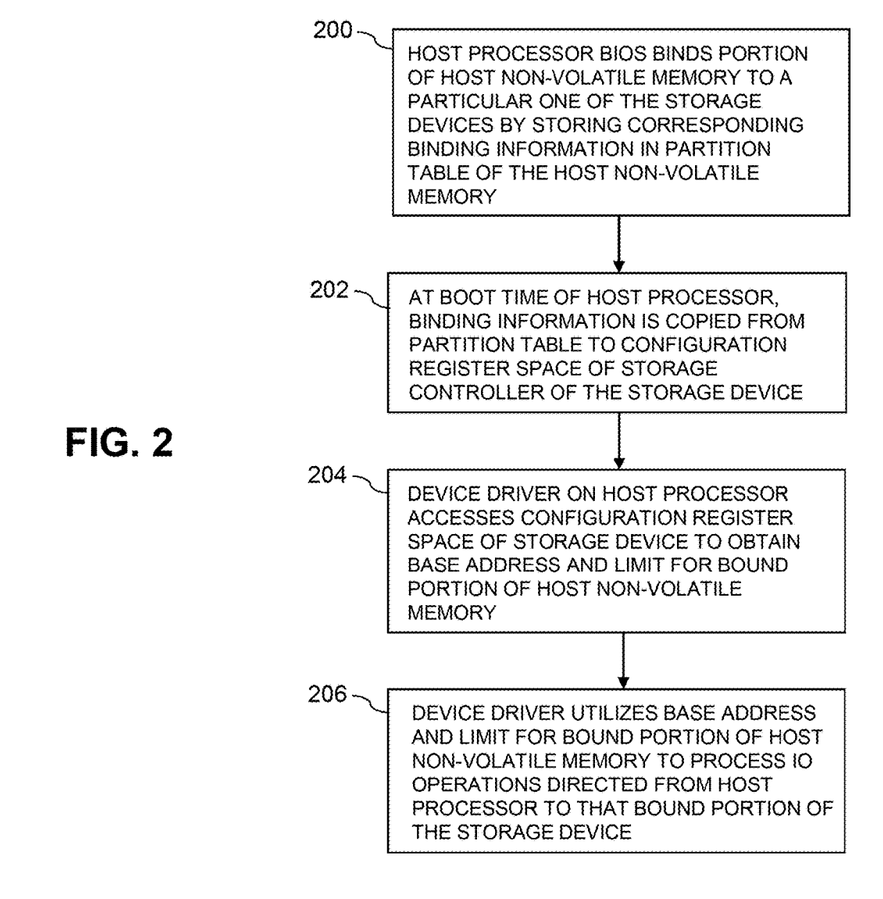
FIG. 2 is a flow diagram of a process for binding of host non-volatile memory to one or more storage devices in a storage system.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a host processor and at least one storage device. For example, the ordering of the process steps may be varied in other embodiments, or certain steps may be performed concurrently with one another rather than serially. Also, one or more of the process steps may be repeated periodically, or multiple instances of the process can be performed in parallel with one another in conjunction with binding of different portions of a host non-volatile memory to different storage devices. Accordingly, multiple instances of the process can be active in parallel on the same host processor but with different storage devices and storage device drivers in each such instance.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

FIGS. 3 through 6 show more detailed views of example storage systems configured to implement binding of host non-volatile memory to one or more storage devices in illustrative embodiments.

Figure 3:
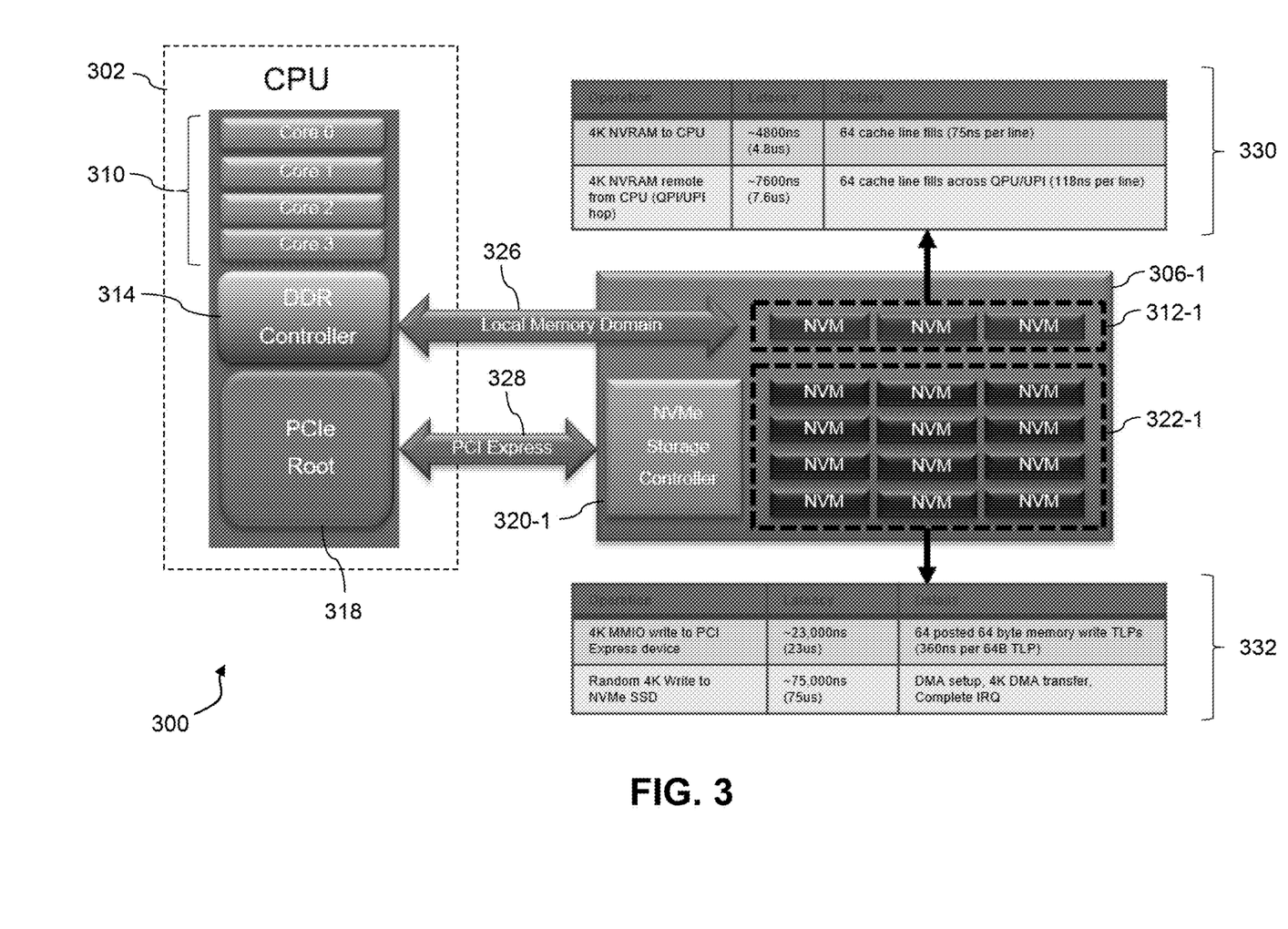
FIGS. 3 through 6 show more detailed views of example storage systems configured to implement binding of host non-volatile memory to one or more storage devices in illustrative embodiments.

Referring now to FIG. 3, a storage system 300 comprises a host processor 302 and a storage device 306-1. The storage device 306-1 in this embodiment is assumed to be an NVMe storage device, and is further assumed to be one of a plurality of such storage devices implemented within the storage system 300, although the other storage devices are omitted from the figure for simplicity and clarity of illustration. The host processor 302 in this embodiment more particularly comprises a CPU having multiple processor cores 310, denoted Core 0, Core 1, Core 2 and Core 3, a designated portion 312-1 of a host non-volatile memory, a memory controller 314 implemented as a double data rate (DDR) controller, and a PCIe root complex 318.

The designated portion 312-1 of the host non-volatile memory is bound to the storage device 306-1, and is illustratively shown as being implemented within the storage device 306-1, although it is actually implemented within the host processor 302. The binding of the designated portion 312-1 of the host non-volatile memory to the storage device 306-1 is assumed to be a permanent binding of the type described elsewhere herein. The host non-volatile memory is assumed to include other designated portions bound to respective additional storage devices of the storage system 300, although such other portions, like the additional storage devices, are not explicitly shown in the figure.

The designated portion 312-1 of the host non-volatile memory is bound to the storage device 306-1 responsive to storage of binding information in at least one partition table associated with the host non-volatile memory. The one or more partition tables of the host non-volatile memory are not shown in this figure.

The storage device 306-1 comprises an NVMe storage controller 320-1 and a non-volatile memory 322-1. The non-volatile memory 322-1 is an example of a second non-volatile memory that in combination with the designated portion 312-1 of the host non-volatile memory that is bound to the storage device 306-1 provides a unified non-volatile memory space for the storage device 306-1.

The designated portion 312-1 of the host non-volatile memory that is bound to the storage device 306-1 is accessible by a storage device driver of the host processor 302 over a local memory fabric 326 associated with a local memory domain of the host processor 302 utilizing local memory semantics. The local memory fabric 326 is separate from a PCIe fabric 328 over which the host processor 302 communicates with the storage device 306-1 via a root port of the PCIe root complex 318 of the host processor 302.

Table 330 lists example operations and associated latencies and other parameters for one possible configuration of the designated portion 312-1 of the host non-volatile memory in this embodiment. The designated portion 312-1 illustratively comprises non-volatile RAM (NVRAM) having a plurality of NVM instances as shown. References in table 330 to QPI denote Quick Path Interconnect, and references to UPI denote Ultra Path Interconnect.

Table 332 lists example operations and associated latencies and other parameters for one possible configuration of the non-volatile memory 322-1 of the storage device 306-1 in this embodiment. As noted above, the storage device 306-1 in this embodiment comprises an NVMe SSD having a plurality of NVM instances as shown. The storage device 306-1 also supports memory-mapped IO (MMIO) operation utilizing PCIe data packets that are commonly referred to as transaction layer packets (TLPs). The acronym IRQ used in table 332 denotes an interrupt request.

An NVMe SSD such as storage device 306-1 may in some cases be used for local storage within a computer, server, workstation or other processing device. A conventional implementation of such a storage device will typically perform very well for high bandwidth operations that transfer large amounts of data between the storage device and memory of the host processor. However, due to the inherent PCIe transaction latency previously described herein, the conventional implementation of such a storage device may not perform very well when many smaller independent operations are performed.

These and other drawbacks of conventional practice are overcome in the present embodiment by binding the designated portion 312-1 of the host non-volatile memory to the storage device 306-1. The storage device 306-1 thereby illustratively obtains a dedicated portion of an extremely low latency high bandwidth host non-volatile memory that is accessible by the host processor 302 and its storage device driver via the local memory fabric 326 using local memory semantics. For example, local memory semantics may be used to temporarily store blocks or sectors of data instead of having to transfer the data via direct memory access (DMA) to the storage device 306-1 over the PCIe fabric 328. The designated portion 312-1 of the host non-volatile memory that is permanently bound to the storage device 306-1 is technically now part of that storage device. Such an arrangement yields extremely low IO latency that is not achievable with any conventional PCIe storage device.

Figure 4:
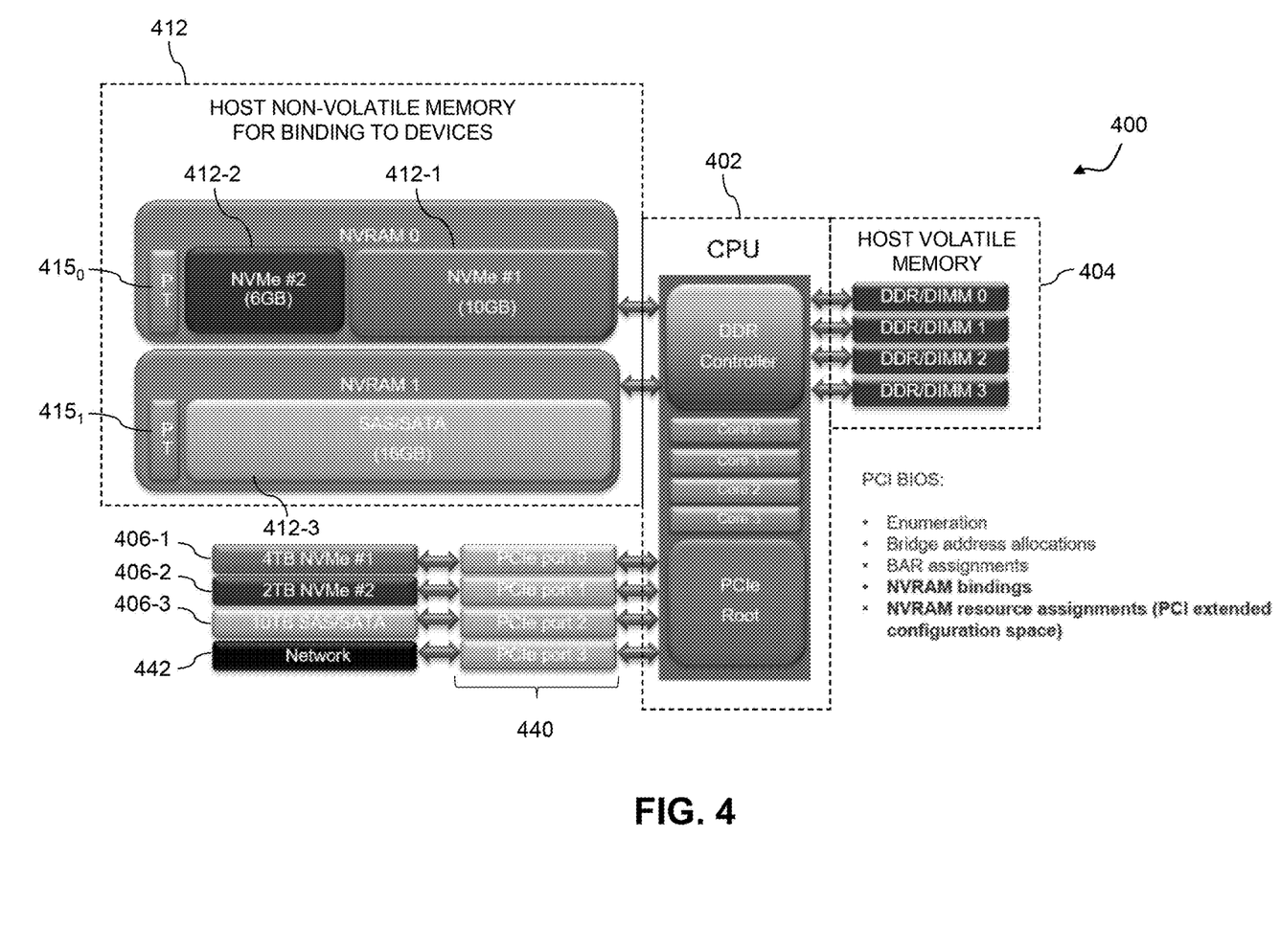

FIG. 4 shows another storage system 400 with binding of host non-volatile memory to storage devices in an illustrative embodiment. The storage system 400 comprises host processor 402 that comprises a multiple-core CPU of the type described in conjunction with FIG. 3. The host processor 402 includes a DDR controller that communicates with DDR dual in-line memory modules (DIMMs) of a volatile memory 404.

The storage system 400 further comprises three different storage devices 406-1, 406-2 and 406-3. The first storage device 406-1 is a four terabyte (4 TB) NVMe SSD, and the second storage device 406-2 is a two terabyte (2 TB) NVMe SSD. The third storage device 406-3 is a ten terabyte (10 TB) SAS/SATA HDD. A wide variety of other arrangements of additional or alternative storage devices can be used in other embodiments.

Also included in the storage system 400 is host non-volatile memory 412 for binding to the storage devices 406. More particularly, the host non-volatile memory 412 comprises first, second and third designated portions 412-1, 412-2 and 412-3 that are bound to the respective first, second and third storage devices 406-1, 406-2 and 406-3. The host non-volatile memory 412 comprises two 16 gigabyte (16 GB) non-volatile memories denoted NVRAM 0 and NVRAM 1, having respective partition tables (PTs) $415_0$ and $415_1$. The designated portions 412-1, 412-2 and 412-3 are of respective sizes 10 GB, 6 GB and 16 GB, and binding information used to bind those portions to their respective storage devices 406-1, 406-2 and 406-3 is stored in the appropriate ones of the PTs 415, which in this embodiment are implemented as part of the respective non-volatile memories NVRAM 0 and NVRAM 1.

The storage devices 406 are illustratively coupled to a PCIe root complex of the host processor 402 via respective ones of a plurality of PCIe ports 440. A network 442 also utilizes one of the PCIe ports 440 to communicate with the host processor 402.

In the FIG. 4 embodiment, it is assumed that the binding of portions of the host non-volatile memory 412 to the storage devices 406 is controlled by the BIOS of the host processor 402, although the BIOS is not explicitly shown in this figure. As mentioned previously, the binding is considered permanent in this embodiment and could be done automatically by the BIOS or manually using a setup menu of the BIOS. Alternative embodiments could utilize other host processor components in addition to or in place of the BIOS to perform the partitioning and binding of the host non-volatile memory 412, such as a BMC of the host processor 402, although such a BMC is also omitted from the figure.

The BIOS of the host processor 402 in this embodiment is responsible for various operations such as enumeration of the PCIe bus and assigning PCI memory resources and interrupt control to each PCIe device within the storage system 400, including bridge address allocations and BAR assignments, as indicated in the figure.

The BIOS also controls the NVRAM bindings and associated NVRAM resource assignments using the PCIe extended configuration space, as will be described below in conjunction with FIGS. 5 and 6. These binding-related functions of the BIOS can be implemented using custom BIOS extensions that are configured to partition the host non-volatile memory 412 into portions and assign the portions to respective ones of the storage devices 406. Such BIOS extensions can allocate host non-volatile memory 412 and assign resource identification details within newly-defined vendor-specific registers of the PCIe configuration register spaces of the respective storage devices 406.

Figure 5:
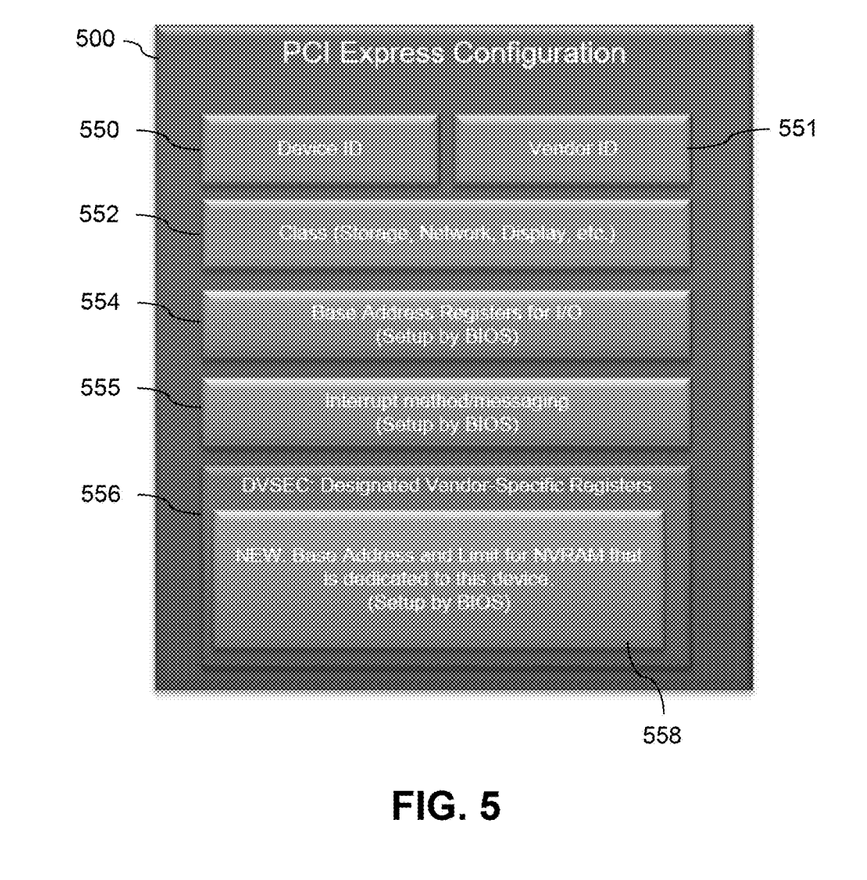

FIG. 5 shows an example of a PCIe configuration register space 500 of a given storage device in an illustrative embodiment. The PCIe configuration register space 500 comprises device ID 550, vendor ID 551, class 552, base address registers 554, interrupt method/messaging 555, and designated vendor-specific registers ("DVSEC") 556.

Within the DVSEC 556, newly-defined vendor-specific registers 558 of the type mentioned previously are implemented. The newly-defined vendor-specific registers 558 store binding information that characterizes the binding of a designated portion of a host non-volatile memory to the given storage device. The binding information in this embodiment comprises a base address and a limit for the designated portion of the host non-volatile memory, illustratively NVRAM, that is bound to the given storage device. Such binding information specifies the physical address and size of the designated portion of the host non-volatile memory that is bound to the given storage device. Designation of newly-defined vendor-specific registers 558 as "new" in the figure should not be construed as an indication that particular other information in this figure or other figures herein is necessarily conventional, although is it to be appreciated that elements of PCIe configuration register space 500 including device ID 550, vendor ID 551, class 552, base address registers 554 and interrupt method/messaging 555 are typically found in conventional PCIe based storage devices.

As previously indicated herein, the binding information may be copied at least in part from one or more partition tables of the host processor to the vendor-specific registers 558 of the PCIe configuration register space 500 of the given storage device, possibly in conjunction with a boot operation of the host processor.

Figure 6:
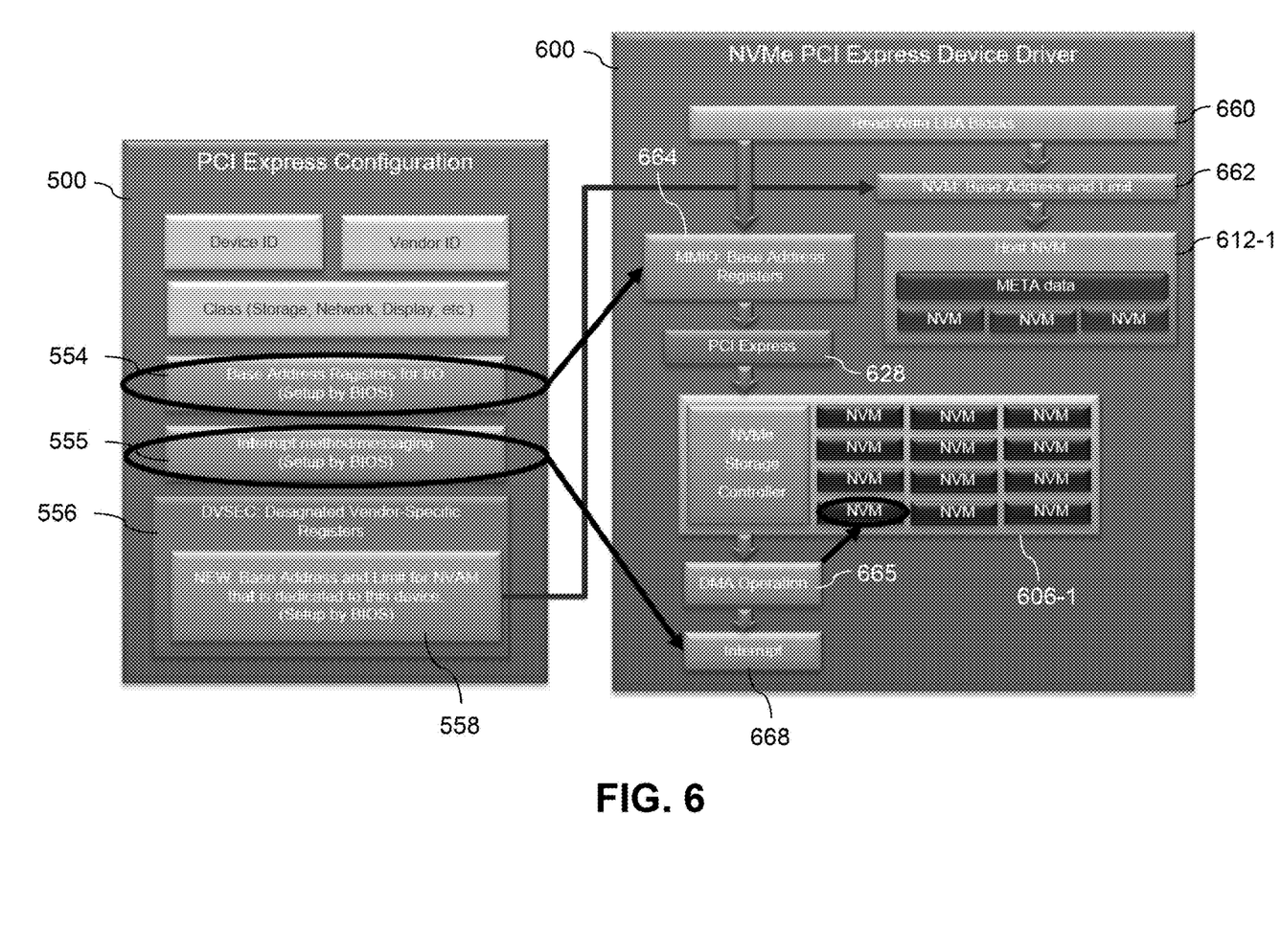

As shown in the illustrative embodiment FIG. 6, a storage device driver 600 of the host processor accesses the PCIe configuration register space 500 to detect the presence of the particular bound portion of the host non-volatile memory and to fully utilize that bound portion as an extension of the physical storage device.

The storage device driver 600 as illustrated in this embodiment is shown as providing access to a storage device 606-1 that includes non-volatile memory and also providing access to a designated portion 612-1 of a host non-volatile memory that is bound to the corresponding storage device via storage of binding information in one or more partition tables of the host non-volatile memory. It is to be appreciated that the storage device driver 600 does not actually include the storage device 606-1 but is instead implemented on the host processor that includes the bound portion 612-1 of the host non-volatile memory. Similarly, other illustrated components such as PCIe fabric 628 are utilized by the storage device driver 600 but not necessarily physically part of the storage device driver 600.

The storage device driver 600 is more particularly implemented as an NVMe PCIe device driver for storage device 606-1 which comprises an NVMe SSD having an NVMe storage controller as shown. The storage device driver 600 may be viewed as corresponding to a more particular implementation of one of the storage device drivers 116 of host processor 102 in the FIG. 1 embodiment. The storage device driver 600 can utilize the bound portion 612-1 of the host non-volatile memory for any purpose. The bound portion 612-1 in this embodiment comprises a plurality of NVM instances and associated metadata.

The storage device driver 600 further includes functional blocks 660, 662, 664, 665 and 668, arranged as shown.

In block 660, the storage device driver 600 receives read and/or write operations for data blocks having particular logical block addresses (LBAs) within the storage system.

In block 662, the storage device driver 600 determines if a given received read and/or write operation is directed to an LBA within the bound portion 612-1 of the host non-volatile memory. This determination is made utilizing the base address and limit of the bound portion 612-1, as obtained from the designated vendor-specific registers 558 of the corresponding PCIe configuration register space 500 of the storage device 606-1. If the read and/or write operation is to an LBA within the bound portion 612-1, it can be serviced with extremely low latency in a manner that avoids utilization of PCIe fabric 628. Otherwise, it is serviced utilizing the PCIe fabric and blocks 664, 665 and 668.

In block 664, the storage device driver 600 obtains the MMIO BAR address from the base address registers 554. The received read and/or write operation is processed using its LBA and the MMIO BAR address to access the storage device 606-1 via the PCIe fabric 628.

In block 665, a DMA operation to the appropriate location in the storage device 606-1 is performed as illustrated.

In block 668, an interrupt is generated using storage device interrupt support information read from the interrupt method/messaging 555.

Additional or alternative storage device driver operations and configurations can be used in other embodiments.

As mentioned previously, illustrative embodiments can provide significant performance improvements relative to conventional arrangements, as will now be described in more detail in conjunction with FIGS. 7 and 8.

FIG. 7 provides example test data showing performance improvements achieved in an illustrative embodiment that utilizes a bound portion of a host non-volatile memory as a write back cache. Implementation of such a write back cache in the manner disclosed herein can provide extremely low write latency. For example, in this particular embodiment the average completion latency for writes is approximately 287 times lower than that of traditional writes to a PCIe based SSD. The test data provided in the figure more particularly shows the performance differential for the PCIe based SSD with and without utilization of a 2 GB write back cache that is implemented using a bound portion of host NVRAM. The test data is generated using a flexible IO (FIO) tester, which is a tool that creates a number of threads each performing a particular type of IO operation as specified by the user, and provides corresponding performance measurements across the threads.

Figure 8:
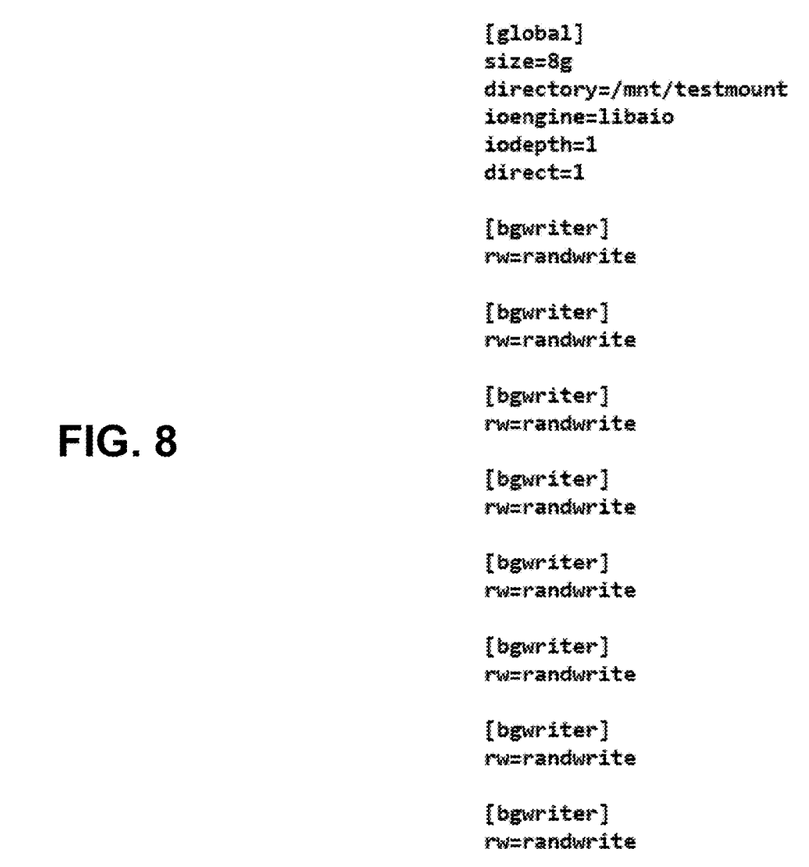
FIG. 8 shows a test script utilized in generating the test data of FIG. 7.

In this embodiment, the FIO tester was configured to utilize eight random 4K write threads, using direct IO and a queue depth of 1, with each thread writing 8 GB of data to the storage device, in accordance with the test script shown in FIG. 8. Direct IO is an arrangement in which IO operations are issued directly to the storage device driver, bypassing any high level volatile caches. The queue depth denotes the number of simultaneous IO operations sent to the storage device driver.

A total of 64 GB of data were written to the storage device during the test. The completion latency ("clat") shown in the test data of FIG. 7 refers to the amount of time between submission and completion for a given IO request. The IOPs ("iops") denotes the number of IO operations per second. As noted above, average completion latency over the 64 GB of data is 287 times lower when using the 2 GB bound portion of the host non-volatile memory as a write back cache.

In other embodiments, the bound portion of the host non-volatile memory can be used for numerous purposes other than as a write back cache.

It is apparent from the above that illustrative embodiments disclosed herein can provide a number of significant advantages relative to conventional arrangements.

For example, one or more embodiments provide an efficient mechanism for binding portions of a host non-volatile memory to respective storage devices.

Illustrative embodiments advantageously avoid the high latency of PCIe interfaces for any accesses to the bound host non-volatile memory, thereby providing dramatic performance improvements relative to conventional arrangements.

For example, the bound portion of the host non-volatile memory in some embodiments comprises high performance non-volatile memory providing read and write performance similar to that of host RAM. Utilization of the bound portion as a write back cache of the storage device or in other contexts can provide significant improvements relative to use of the storage device alone.

The disclosed techniques can be used with any type of storage devices, including solid-state storage devices and disk-based storage devices. Performance improvements may be even more dramatic in embodiments involving disk-based storage devices, as such devices are typically slower but with higher capacity than solid-state storage devices, and so can benefit to a greater extent from utilization of a bound portion of the host non-volatile memory.

It is to be appreciated that the particular advantages described above are associated with particular illustrative embodiments and need not be present in other embodiments. Also, the particular types of storage system features and functionality as illustrated in the drawings and described above are exemplary only, and numerous other arrangements may be used in other embodiments.

It was noted above that portions of a storage system or an associated information processing system as disclosed herein may be implemented using one or more processing platforms. Illustrative embodiments of such platforms will now be described in greater detail. These and other processing platforms may be used to implement at least portions of other storage systems or information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within a storage system or an associated information processing system. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of a storage system or an associated information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of an information processing system over any type of network or other communication media.

As indicated previously, components of a storage system or an associated information processing system as disclosed herein can be implemented at least in part in the form of one or more software programs stored in memory and executed by a processor of a processing device. For example, at least portions of the functionality of host processor 102 and storage devices 106 are illustratively implemented in the form of software running on one or more processing devices.

As a more particular example, at least portions of the storage device drivers 116 of host processor 102 in some embodiments are implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of different types of information processing systems, utilizing various arrangements of host processors, storage devices, non-volatile and volatile memories, memory controllers, storage device drivers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage system comprising:
   a host processor comprising a first non-volatile memory; and
   a storage device coupled to the host processor;
   wherein a designated portion of the first non-volatile memory is bound to the storage device responsive to storage of binding information in at least one partition table associated with the first non-volatile memory; and
   wherein the storage system further comprises one or more additional storage devices each coupled to the host processor and wherein different portions of the first non-volatile memory are bound to respective different ones of the storage devices by storage of respective different binding information in the one or more partition tables associated with the first non-volatile memory.

2. The storage system of claim 1 wherein the storage device comprises a second non-volatile memory that in combination with the designated portion of the first non-volatile memory bound to the storage device provides a unified non-volatile memory space for the storage device.

3. The storage system of claim 1 wherein the one or more partition tables are part of the first non-volatile memory.

4. The storage system of claim 1 wherein the storage device comprises a storage controller that includes a configuration register space.

5. The storage system of claim 4 wherein at least a portion of the binding information is copied from the one or more partition tables to the configuration register space in conjunction with a boot operation of the host processor.

6. The storage system of claim 5 wherein the host processor further comprises a storage device driver having access to the binding information copied to the configuration register space of the storage device.

7. The storage system of claim 6 wherein the storage device driver is configured to utilize the designated portion of the first non-volatile memory that is bound to the storage device as a write back cache.

8. The storage system of claim 6 wherein the designated portion of the first non-volatile memory that is bound to the storage device is accessible by the storage device driver over a local memory fabric of the host processor utilizing local memory semantics.

9. The storage system of claim 8 wherein the local memory fabric is separate from a PCIe fabric over which the storage device communicates with a root port of a PCIe root complex of the host processor.

10. The storage system of claim 1 wherein the binding information comprises at least a base address and a limit for the designated portion of the first non-volatile memory that is bound to the storage device.

11. The storage system of claim 4 wherein at least a portion of the binding information is copied from the one or more partition tables to one or more designated vendor-specific registers of a PCIe configuration register space of the storage device in conjunction with a boot operation of the host processor.

12. The storage system of claim 1 wherein storage of the binding information in the one or more partition tables to bind the designated portion of the first non-volatile memory to the storage device is performed at least in part by a basic input/output system (BIOS) of the host processor of the storage system.

13. The storage system of claim 1 wherein storage of the binding information in the one or more partition tables to bind the designated portion of the first non-volatile memory to the storage device is performed at least in part by a baseboard management controller (BMC) of the host processor of the storage system.

14. A method comprising:
   associating at least one partition table with a first non-volatile memory of a host processor of a storage system; and
   binding a designated portion of the first non-volatile memory to a storage device of the storage system responsive to storage of binding information in the partition table associated with the first non-volatile memory;
   wherein at least a portion of the binding information is copied from the one or more partition tables to a configuration register space of a storage controller of the storage device in conjunction with a boot operation of the host processor; and
   wherein a storage device driver of the host processor is configured to access the binding information copied to the configuration register space of the storage controller of the storage device in order to determine at least a base address and a limit for the designated portion of the first non-volatile memory that is bound to the storage device.

15. The method of claim 14 wherein the storage system further comprises one or more additional storage devices each coupled to the host processor and wherein different portions of the first non-volatile memory are bound to respective different ones of the storage devices by storage of respective different binding information in the one or more partition tables associated with the first non-volatile memory.

16. The method of claim 14 wherein the designated portion of the first non-volatile memory that is bound to the storage device is accessible by the storage device driver over a local memory fabric of the host processor utilizing local memory semantics.

17. A computer program product comprising a non-transitory processor-readable storage medium having stored therein program code of one or more software programs, wherein the program code, when executed by a storage system comprising a host processor and a storage device, causes the storage system:

to associate at least one partition table with a first non-volatile memory of the host processor of the storage system; and to bind a designated portion of the first non-volatile memory to the storage device of the storage system responsive to storage of binding information in the partition table associated with the first non-volatile memory;

wherein at least a portion of the binding information is copied from the one or more partition tables to a configuration register space of a storage controller of the storage device in conjunction with a boot operation of the host processor; and wherein a storage device driver of the host processor is configured to access the binding information copied to the configuration register space of the storage controller of the storage device in order to determine at least a base address and a limit for the designated portion of the first non-volatile memory that is bound to the storage device.

18. The computer program product of claim 17 wherein the storage system further comprises one or more additional storage devices each coupled to the host processor and wherein different portions of the first non-volatile memory are bound to respective different ones of the storage devices by storage of respective different binding information in the one or more partition tables associated with the first non-volatile memory.

19. The computer program product of claim 17 wherein the designated portion of the first non-volatile memory that is bound to the storage device is accessible by the storage device driver over a local memory fabric of the host processor utilizing local memory semantics.

20. The computer program product of claim 17 wherein the one or more partition tables are part of the first non-volatile memory.

* * * * *